G. W. ROTH.
ENGINE STARTER.
APPLICATION FILED JUNE 10, 1910.
1,077,858.
Patented Nov. 4, 1913.
3 SHEETS—SHEET 3.
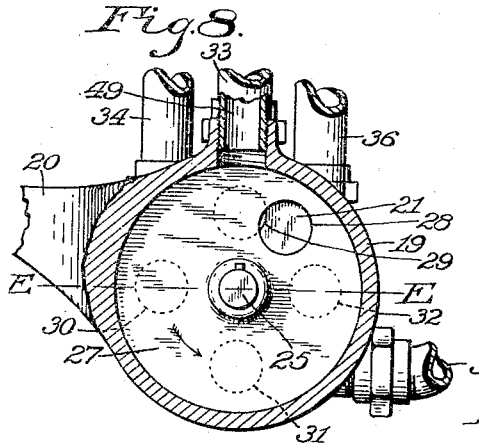
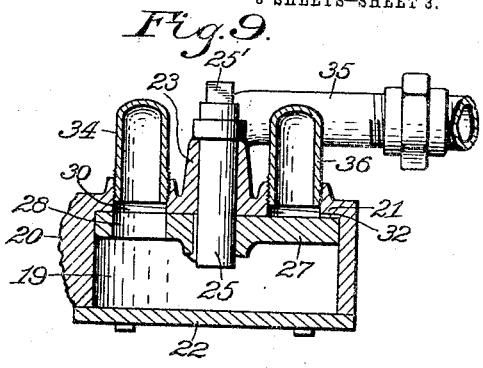
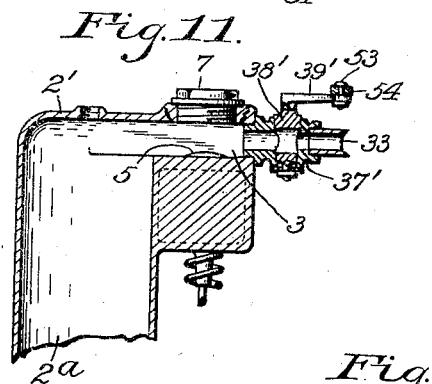
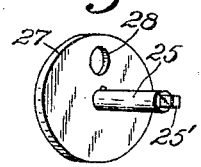
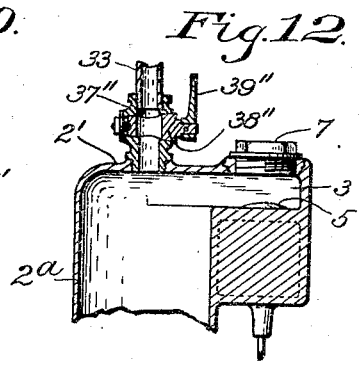
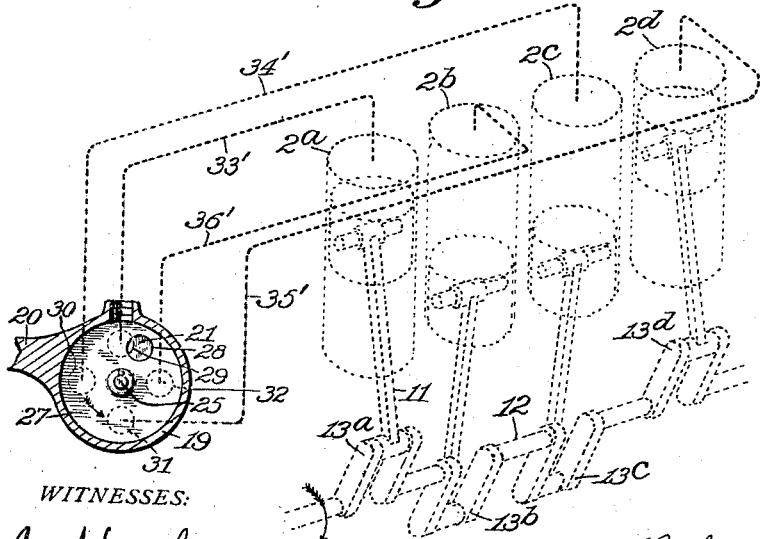
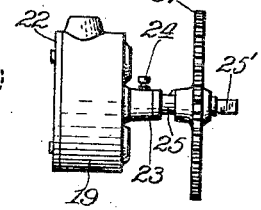
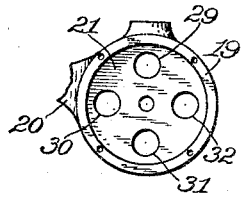
WITNESSES:
J. H. Gardner
K. R. Woddell
INVENTOR:
Gilson W. Roth,
BY
E. T. Silvius,
ATTORNEY.

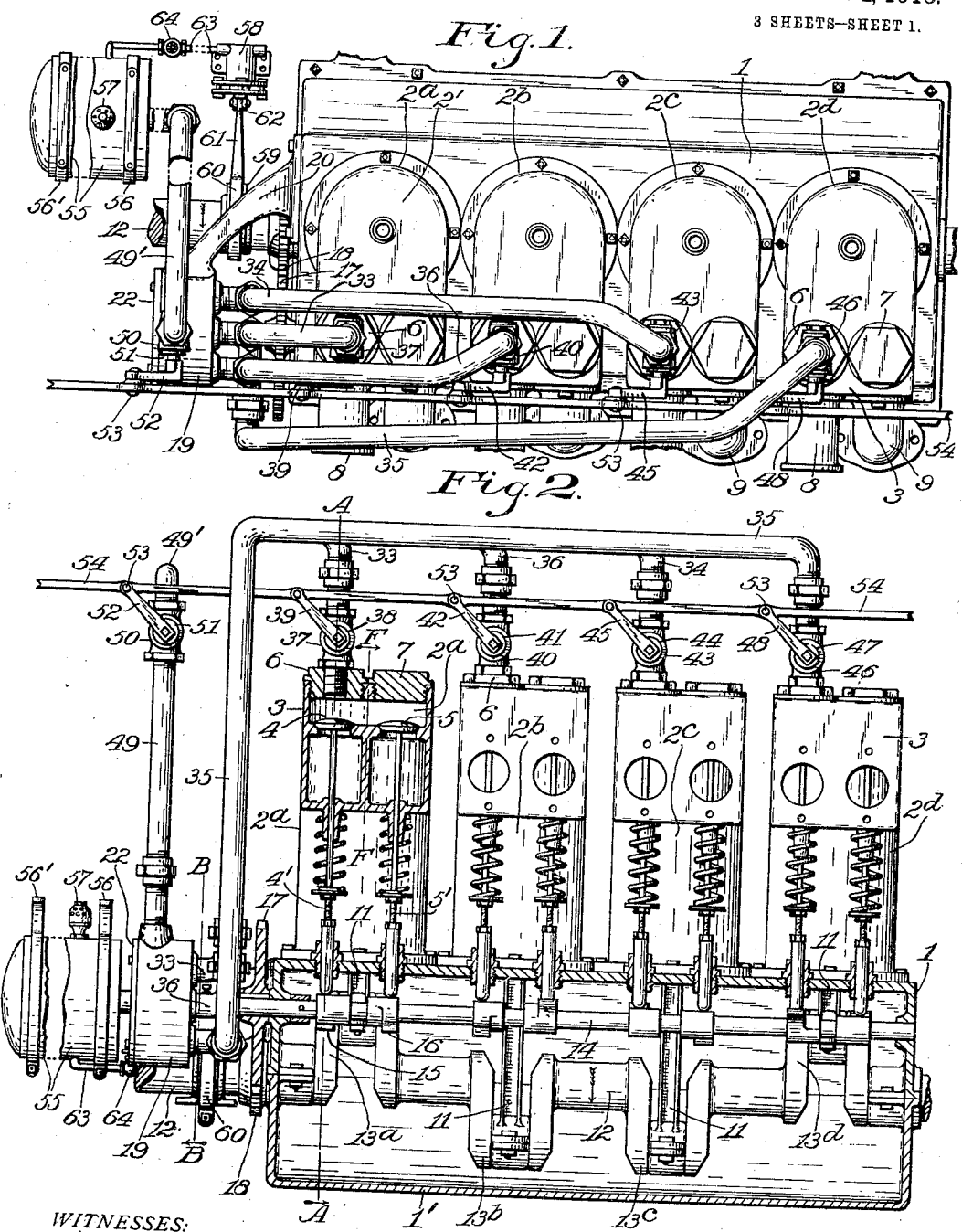

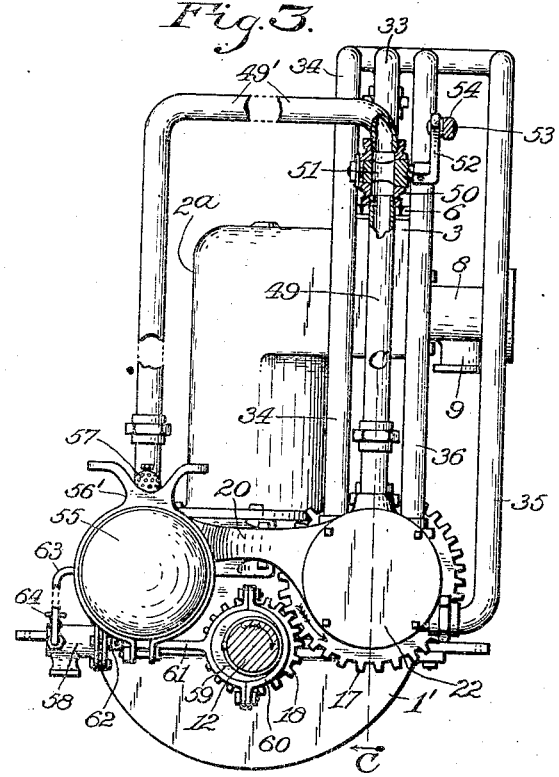
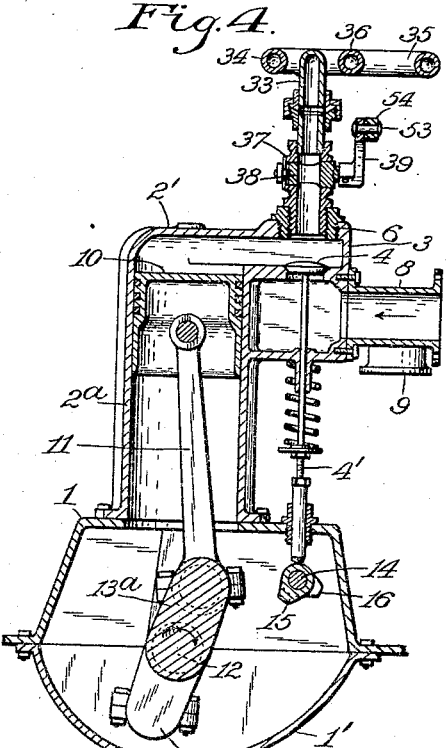
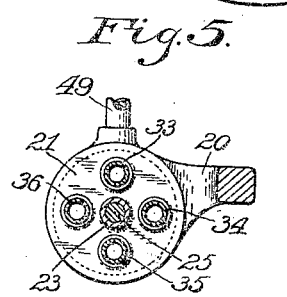
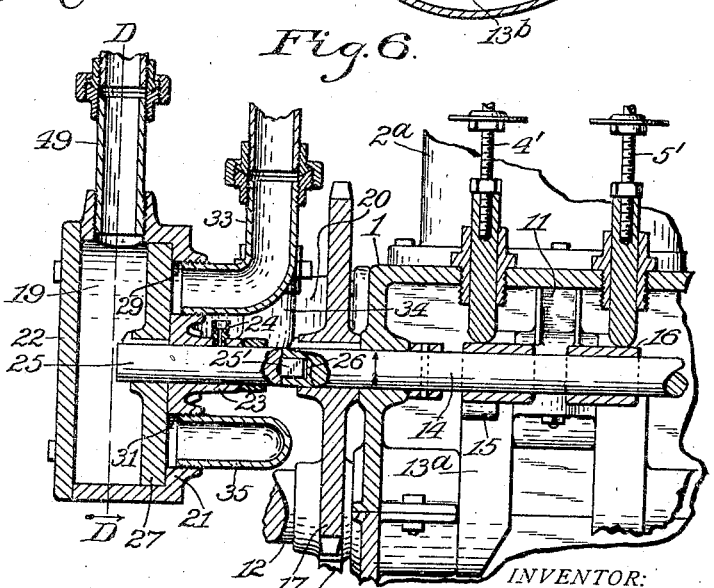

UNITED STATES PATENT OFFICE.

GILSON W. ROTH, OF JACKSON TOWNSHIP, BROWN COUNTY, INDIANA, ASSIGNOR, BY DIRECT AND MESNE ASSIGNMENTS, TO GEORGE H. EVANS, OF EVANSVILLE, INDIANA.

ENGINE-STARTER.

1,077,858.   Specification of Letters Patent.   Patented Nov. 4, 1913.

Application filed June 10, 1910. Serial No. 566,131.

*To all whom it may concern:*

Be it known that I, GILSON W. ROTH, a citizen of the United States, residing in Jackson township, in the county of Brown and State of Indiana, have invented certain new and useful Improvements in Engine-Starters; and I do declare the following to be a full, clear, and exact description of the invention, reference being had to the accompanying drawings, and to the letters and figures of reference marked thereon, which form a part of this specification.

This invention relates to means for starting internal combustion engines, particularly such as are employed in the construction of automobiles and similar motor vehicles, the invention having reference particularly to apparatus whereby fluid pressure may be utilized in the explosion cylinders and upon pistons for starting the engine or engines when at rest; and the invention has reference also to an improved method of starting explosion engines by means of fluid pressure.

The object of the invention is to provide an improved method of and means for starting explosion engines promptly when stopped temporarily, so as to effectually guard against accidents which may be due to inadvertent stopping of the engine, particularly when automobiles are on railroad crossings, or when another vehicle might collide with it.

A further object is to provide an engine starter of the above-mentioned character that will be adapted to be manufactured at small cost and be convenient in operation, and be durable and economical in use; a still further object being to provide an engine starter that will be adapted to be used in connection with automobile engines of the explosion type and be adapted to be controlled by means of a single device either by hand or foot operated connections.

The invention comprises improved apparatus, in combination in a novel manner with one or more engine explosion cylinders and also with the mechanism of the engine, enabling an operator to admit fluid pressure to the cylinder or cylinders for starting the engine; and the invention consists further in the parts, and combinations and arrangements of parts, as hereinafter particularly described and claimed.

Referring to the drawings, Figure 1 is a top plan of a common type of four cylinder explosion engine with which the invention is connected; Fig. 2, a vertical sectional elevation of the same in which the crank-box is in section at the plane of the cam-shaft that operates intake and exhaust valves; Fig. 3, an end elevation of the engine and starting apparatus partially in section; Fig. 4, a vertical sectional view on the line A A in Fig. 2; Fig. 5, a fragmentary section on the line B B in Fig. 2; Fig. 6, a fragmentary vertical section at the plane of the line C C in Fig. 3; Fig. 7, a fragmentary detail of a modification in construction; Fig. 8, a fragmentary sectional view on the line D D in Fig. 6; Fig. 9, a horizontal section on the line E E in Fig. 8; Fig. 10, a perspective view of the controlling valve for admitting fluid pressure to the cylinders; Fig. 11, a fragmentary section approximately on the line F F in Fig. 2 showing a modification in construction; Fig. 12, a fragmentary section also on the line F F in Fig. 2 showing another modification in construction; Fig. 13, a diagrammatical illustration in broken lines showing the arrangement of the principal parts of the engine perspectively, and clearly indicating the arrangement of the conduits between the controlling valve and the cylinders whereby the fluid pressure is admitted to the cylinders in sequence corresponding to the order in which explosions normally occur; Fig. 14, an elevation of the controlling valve with a modified arrangement by which it may be connected to the engine for operation; and Fig. 15, a plan of the controlling valve chest ports through which the fluid pressure passes to the engine cylinders.

Similar reference characters in the different figures of the drawings indicate like parts or features herein referred to.

In order that the improved means for starting explosion engines may be clearly understood, the essential features of a four cylinder explosion engine are illustrated, and it should be understood that an engine having any desired number of cylinders may be started equally well in accordance with the invention.

In the drawings the construction of the engine will be readily understood, the numeral 1 indicating the main frame which with an oil reservoir 1' connected thereto constitutes the crank-box on which four identical cylinders $2^a$, $2^b$, $2^c$, $2^d$, are mounted, each cylinder having an explosion chest 3 thereon which is in communication with the upper portion of the cylinder and provided with the usual intake valve 4 and exhaust valve 5 provided respectively with operating stems 4' and 5', the top of each explosion chest having the usual openings therein above the valves through which the valves may be inserted or withdrawn for repairs, the openings having closures 6 and 7 therein and in the present case the closure 6 instead of being in the form of a plug as usual is constructed as a bushing through which the fluid pressure may be admitted into the cylinder.

The numeral 8 indicates the intake and 9 the exhaust pipe for each cylinder. Each cylinder, of course, has a piston 10 therein to which is connected a pitman 11 as usual, 12 indicating the crank shaft having four cranks $13^a$, $13^b$, $13^c$, $13^d$, to each of which a pitman is connected as usual. The engine is of the type that has a cam shaft 14 mounted in the crank-box conveniently near to the crank-shaft and it has a suitable number of cams 15 thereon for operating the stems of the intake valves, and other cams 16 for operating the stems of the exhaust valves, the shaft 14 having a gear wheel 17 secured thereto which is in mesh with a smaller gear wheel 18 which is secured to the crank shaft 12, the arrangement being such that the crank-shaft makes two revolutions to one of the cam shaft as is usual.

In carrying out the objects of the invention a suitable main valve is provided for controlling the admission of fluid pressure to the cylinders and it may be variously connected with the engine mechanism, so as to be operated thereby preferably at the same rate of speed as the cam shaft of the engine, such arrangement permitting simplicity of construction; and in carrying out this idea the main valve is shown in connection with the cam shaft, and it preferably comprises a body part 19 of a valve-chest preferably provided with a bracket 20 by which it is supported on the crank-box of the engine, the valve-chest comprising a head 21 that is integral with the body part and a removable opposing head 22, the head 21 having a journal-box 23 thereon to which an oil-cup 24 is connected. A shaft 25 is rotatively mounted in the journal-box and has a squared shank 25' on its outer end which is inserted in a suitable socket 26 formed in the outer end of the cam shaft 14. The opposite end of the shaft 25 which extends into the valve-chest has a disk-valve 27 secured thereto that is seated movably against the inner side of the head 21, the latter constituting a valve-seat against which the valve moves rotatively in operation, the valve 27 having a port 28 therein at a suitable distance from its axis. The head 21 of the valve-chest has four ports 29, 30, 31 and 32 therein, arranged in a circle about the axis of the shaft 25 at the same distance therefrom as the port 28 is from the axis, and it will be seen that when the port 28 is between two of the ports in the head all the ports in the head are covered and on rotation of the valve 27 each port in the valve-seat or head 21 is opened and then closed in succession. It will be understood that the head 21 has the same number of ports as there are cylinders and consequently in every case the number of ports must correspond to the number of cylinders comprised in the engine, unless in some cases it be desired to use only a limited number of the cylinders when there are many for starting the engine, it being evident that if there be six or eight cylinders the engine may be readily started when not loaded by admitting the fluid pressure into only one or several of the cylinders. In the present case as illustrating the invention four fluid pressure conduits 33, 34, 35 and 36 are connected with the ports 29, 30, 31 and 32, respectively, and the conduits are suitably arranged and connected so as to conduct fluid pressure to the cylinders $2^a$, $2^c$, $2^d$ and $2^b$ in succession corresponding to the order in which explosions occur in the cylinders as commonly arranged.

Referring to Fig. 13 the broken lines 33', 34', 35' and 36' indicate the respective conduits in the order mentioned and their relative arrangements with the ports and the cylinders. As shown the bushing 6 connected to the explosion-chest of the cylinder $2^a$ has a suitable valve-body 37 connected thereto in which is a plug-valve 38 provided with an operating arm 39; the cylinder $2^b$ is likewise provided with a valve comprising a body 40, a plug-valve 41 and operating-arm 42. The cylinder $2^c$ is provided also with a valve comprising a body 43, and a valve 44 having an arm 45, and the cylinder $2^d$ is similarly provided with a valve comprising a body 46, a plug valve 47 and operating arm 48. The valves are all of identical construction and preferably of the stop-cock type indicated, although they may be of other types for preventing flow of fluid from the cylinders to the controlling valve. The conduit 33 is connected to the valve body 37; the conduit 36 is connected to the valve body 40; the conduit 34 is connected to the valve body 43; and the conduit 35 is connected to the valve body 46. The valves are adapted to open or close communication between the conduits and the explosion chests and consequently with respective cylinders, and it will be seen that when the valves are opened the fluid pressure is conducted successively to the first, third, fourth and second cylinders in the order of their arrangement from left to right, in which order it is usually arranged that explosions occur, the arrangement, of course, depending upon the setting of the cams 15 and 16 on the cam shaft 14 for the valves of the different cylinders, as will be understood.

A conduit 49 is connected to the valve-chest body 19 and preferably has a suitable starting valve-body 50 connected thereto to which a supply-pipe 49' is connected, there being a starting-valve 51 rotative in the valve body 50 and provided with an operating arm 52. The operating arms 39, 42, 45, 48 and 52 are each provided with a pivot 53 and an operating rod 54 is connected to all the pivots, so as to operate and control all the operating arms simultaneously. The operating rod 54 obviously may be extended to any desired point where it may be conveniently reached for operation.

The starting valve and body may be variously constructed and arranged at a suitable distance from the controlling valve.

The supply-pipe 49' may be variously supplied with fluid pressure, but for economic reasons compressed air is utilized in the present case. A suitable reservoir 55 is provided which has supporting devices 56 and 56' thereon of suitable construction whereby the reservoir may be connected to a convenient frame or support, and preferably the reservoir is provided with a suitable pop-valve 57 for preventing over-pressure therein, but obviously over-pressure may be otherwise prevented if preferred. An air compressor preferably comprising a cylinder 58 is employed and suitably operated, preferably by means of an eccentric 59 secured to the crank shaft 12 and having an eccentric strap 60 thereon provided with an eccentric-rod 61 which is pivotally connected to the pump-rod or plunger 62 that coöperates with the cylinder for creating the required air-pressure, the air compressor being connected to the pipe 63 which is connected with the reservoir 55 and preferably has a retaining valve 64 connected therewith which may be closed for holding the pressure in the reservoir when the engine is at rest during long periods of time.

By reference to Fig. 11 it will be seen that the valve-body 37' is connected to the front of the explosion-chest 3 instead of being mounted on the top thereof as hereinbefore described, and has a plug valve 38' therein provided with an operating arm 39' conveniently connected to the operating-rod 54, this arrangement being convenient in some cases. In other cases it may be convenient to modify the arrangement as shown in Fig. 12 in which a corresponding valve body 37'' is connected to the cylinder-head 2' and provided with a plug-valve 38'' and operating arm 39''.

When not convenient to provide the cam shaft 14 with the socket 26 the shaft 25 may be connected directly to a socket coupling 65 which may be secured to the shaft 14 by means of a pin 66 as illustrated in Fig. 7.

In case it be desired to connect the shaft 25 of the main or controlling valve otherwise than as hereinbefore described the shaft 25 is provided with a gear-wheel 67 as in Fig. 14 which is of the same diameter as the gear-wheel 17 and therefore may be driven in connection therewith, or obviously the gear wheel 67 may be arranged in mesh with the gear-wheel 18, so as to be driven directly thereby, the result in either case being that the shaft 25 rotates at the same speed as the cam shaft 14.

It will be clear from the foregoing that various other modifications than those indicated with respect to minor details of construction may fairly be made within the scope of the appended claims, as, obviously the valves connected with the conduits 33, 34, 35 and 36 may be variously constructed and operated.

In practical use, the reservoir 55 being assumed to contain compressed air and the engine being at rest the operator simply moves the operating-rod 54 in the required direction, so as to open communication between the reservoir and the valve-chest of the controlling valve for supplying air through the conduits to the cylinders. When the explosion engine stops it will be understood that owing to compressions in the cylinders when the pistons rise the cranks do not stop on dead centers and therefore the pistons stop at some distance from the cylinder heads. It will be clear, therefore that at least one piston may be expected to be approximately in the position illustrated in Fig. 4 or probably lower, so that when the compressed air is admitted upon the piston the latter is forced down and causes the crank-shaft to rotate. It will be apparent also that inasmuch as the valve 27 operates in unison with the cam-shaft 14 the compressed air is admitted through the different conduits into the different cylinders at the proper periods to actuate the pistons therein in the order in which they would be actuated if explosions occurred, and by the time each piston is actuated in succession the cylinders in which they operate will begin to receive explosion charges after the compressed air is exhausted by the operation of the regular exhaust valves and then, the operator having set in operation the carbureter and sparking apparatus the explosions occur as usual, and then the operating rod 54 is moved in the reverse direction to close all the air-valves connected therewith in order to cut off the compressed air from the conduit 49 and prevent the explosive force in the cylinders from entering the conduits connected therewith. When the reservoir 55 is exhausted of its supply it will be understood that the reservoir may be charged in any suitable manner or the engine may first be started in the usual manner by hand. After the engine is in operation it will be clear that it will automatically keep the reservoir filled with compressed air ready for use.

Having thus described the invention, what is claimed as new, is—

1. In an engine-starter, the combination of an explosion-cylinder, a crank-shaft, a piston movable in the explosion-cylinder and connected with the crank-shaft, a reservoir, an air-compressor operatively connected with the crank-shaft, a conduit connected with the air-compressor and the reservoir, a stop-valve connected with the explosion-cylinder, a conduit connected with the stop-valve, a supply-conduit connected to the reservoir and having a stop-valve therein, an operating-rod connected with the stop-valves for simultaneous operation thereof, and a main valve connected with the second-mentioned conduit and the supply-conduit and operatively connected also with the crank-shaft for controlling admission of compressed air to the explosion-cylinder on outward-strokes of the piston, with means for admitting explosion charges to the explosion-cylinder at sequential times succeeding the admission of compressed-air thereto.

2. In an engine-starter, the combination with an explosion-cylinder, a main shaft, a piston in the explosion-cylinder connected with the main shaft, a valve-operating-shaft operatively connected with the main shaft, a frame supporting the explosion-cylinder, and means controlled by the valve-operating-shaft for admitting explosion charges to the explosion-cylinder, of a reservoir, an air-compressor connected with the reservoir, a stop-valve connected with the explosion-cylinder, a conduit connected with the stop-valve, a valve-chest connected with the conduit and provided with a valve-seat having a port therein extending to the conduit, a bracket secured to the frame and supporting the valve-chest, a rotative shaft mounted in the valve-chest and driven by the valve-operating-shaft, a main valve in the valve-chest secured to the rotative shaft for opening or closing the port, and a supply-conduit connected with the reservoir and the valve-chest.

3. In an engine starter, the combination with a frame, a plurality of explosion-cylinders mounted on the frame, a crank-shaft mounted in the frame, pistons in the explosion-cylinders connected with the crank-shaft, and means operatively connected with the crank shaft for admitting explosion charges into the explosion-cylinders, of a reservoir, an air-compressor connected operatively with the crank-shaft, a conduit connected with the air-compressor and the reservoir, a supply-conduit connected with the reservoir, a starting-valve body connected to the supply-conduit, a valve operatively mounted in the starting valve body and having an operating-arm thereon, a plurality of stop-valve bodies connected each with a different one of the explosion cylinders, stop valves operatively mounted in the stop-valve bodies and having each an operating arm thereon, a plurality of pipes connected each to a different one of the stop-valve bodies, a valve-chest connected with the starting-valve body and also with the plurality of pipes and having ports therefor, a bracket connected substantially with the frame and supporting the valve-chest in proximity to the frame, a valve-shaft rotative in the valve-chest, gearing operatively connecting the valve-shaft with the crank-shaft, a main valve in the valve-chest fixed to the valve-shaft for opening or closing the ports, and an operating-rod pivotally connected to all of the operating-arms.

4. In an engine starter, the combination with a frame, a plurality of explosion-cylinders mounted on the frame, a crank-shaft rotatably mounted in the frame, pistons movable in the explosion-cylinders and connected with the crank-shaft, and means operatively connected with the crank-shaft for admitting explosion charges into the explosion-cylinders, of a closed reservoir, an air-compressor operatively connected with the crank-shaft, a conduit connected with the air-compressor and the reservoir, a pressure-retaining valve in the conduit, a supply conduit connected with the reservoir, a starting-valve body connected to the supply-conduit, a valve operatively mounted in the starting-valve body and having an operating-arm thereon, an operating-rod connected to the operating-arm, a plurality of stop-valve bodies connected each with a different one of the explosion-cylinders, stop-valves movably mounted in the stop-valve bodies, a plurality of pipes connected each to a different one of the stop-valve bodies, a valve-chest connected with the starting-valve body and also with the plurality of pipes and having ports therefor, a valve-shaft movable in the valve-chest, gearing operatively connecting the valve-shaft with the crank-shaft, and a main valve in the valve-chest fixed to the valve-shaft for opening or closing the ports.

In testimony whereof, I affix my signature in presence of two witnesses.

GILSON W. ROTH.

Witnesses:
 E. T. SILVIUS,
 K. R. WODDELL.